United States Patent [19]

Ragone et al.

[11] 3,945,629
[45] Mar. 23, 1976

[54] REFRACTORY CARBIDE PARTICLES WITH THIN OUTER LAYER OF HIGHLY CRYSTALLINE CARBON

[75] Inventors: David V. Ragone; Massoud T. Simnad, both of San Diego, Calif.

[73] Assignee: General Atomic Company, San Diego, Calif.

[22] Filed: Dec. 22, 1965

[21] Appl. No.: 515,741

[52] U.S. Cl. .............................. 269/.5; 176/91 SP
[51] Int. Cl.² ......................................... G21C 21/00
[58] Field of Search ........ 176/91, 67, 91 SP; 264/.5; 23/349

[56] References Cited
UNITED STATES PATENTS

| | | | |
|---|---|---|---|
| 1,829,950 | 11/1931 | Voiztlander et al. .................. | 23/349 |
| 3,129,188 | 4/1964 | Sawman et al. ..................... | 264/.5 X |
| 3,163,609 | 12/1964 | Sawman et al. ..................... | 264/.5 |
| 3,179,722 | 4/1965 | Shoemaker ............................. | 264/.5 |
| 3,179,723 | 4/1965 | Goeddel ................................. | 264/.5 |

*Primary Examiner*—Verlin R. Pendegrass
*Assistant Examiner*—Peter A. Nelson
*Attorney, Agent, or Firm*—Fitch, Even, Tabin & Luedeka

EXEMPLARY CLAIM

1. A method of making refractory carbide particles, which method comprises heating a granule containing refractory metal and carbon to a sufficient temperature to form a molten droplet of refractory carbide, carbon being included in said droplet in excess of the stoichiometric amount which combines with the refractory metal in the highest usual valence thereof, and cooling said molten droplet below the eutectic temperature within 60 seconds or less to cause a thin continuous layer of highly crystalline carbon to precipitate out on the outer surface thereof.

10 Claims, 2 Drawing Figures

INVENTORS
DAVID V. RAGONE
MASSOUD T. SIMNAD

BY Anderson, Luedeka, Fitch, Even, & Tabin
ATTORNEYS

REFRACTORY CARBIDE PARTICLES WITH THIN OUTER LAYER OF HIGHLY CRYSTALLINE CARBON

This invention relates to carbides and more particularly to refractory carbide particles having improved stability at high temperatures.

Refractory carbide particles, especially particles which are useful in nuclear energy applications, are often exposed to high temperatures, for example, temperatures above 2000°C., for prolonged periods of time. In such operations, it is often important that the refractory carbide material be maintained in a particulate form and that a particular particle shape be also maintained, e.g., a spheroid.

Attempts have been made to encase refractory carbide particles in jackets of various sorts to prevent subsequent migration of the refractory carbide material outside the enclosing jacket. In nuclear reactor applications, pyrolytic carbon coatings have been quite useful as jacketing materials because pyrolytic carbon is compatible with the refractory carbide material and because the carbon has moderating properties useful in certain nuclear energy applications. None of the previously jacketed refractory carbide particles has proved totally successful in every aspect. Under certain conditions, migration of the refractory material through the jacket during exposure to high temperatures for prolonged periods remains a problem. Methods of producing improved refractory carbide particles which are resistant to such migration are desired.

It is an object of the present invention to provide a method for making refractory carbide particles having improved stability at high temperatures and to provide useful particles produced by this method. It is another object of the invention to provide a method for producing refractory carbide particles jacketed so as to prevent migration of the refractory material through the jacket even though the particles are exposed to high temperatures for prolonged periods. It is a further object to provide a method for making refractory carbide particles for nuclear energy applications which particles have excellent stability although exposed to high temperature for prolonged periods of time. It is a still further object to provide a method for making nuclear fuel carbide particles which are jacketed so as to prevent migration of the nuclear fuel material to the exterior of the jacket although the particles may be exposed to operating temperatures at which the nuclear fuel material becomes partially molten.

These and other objects of the invention are more particularly set forth in the following detailed description of processes embodying various features of the invention and in the accompanying drawings wherein.

Figure 1:
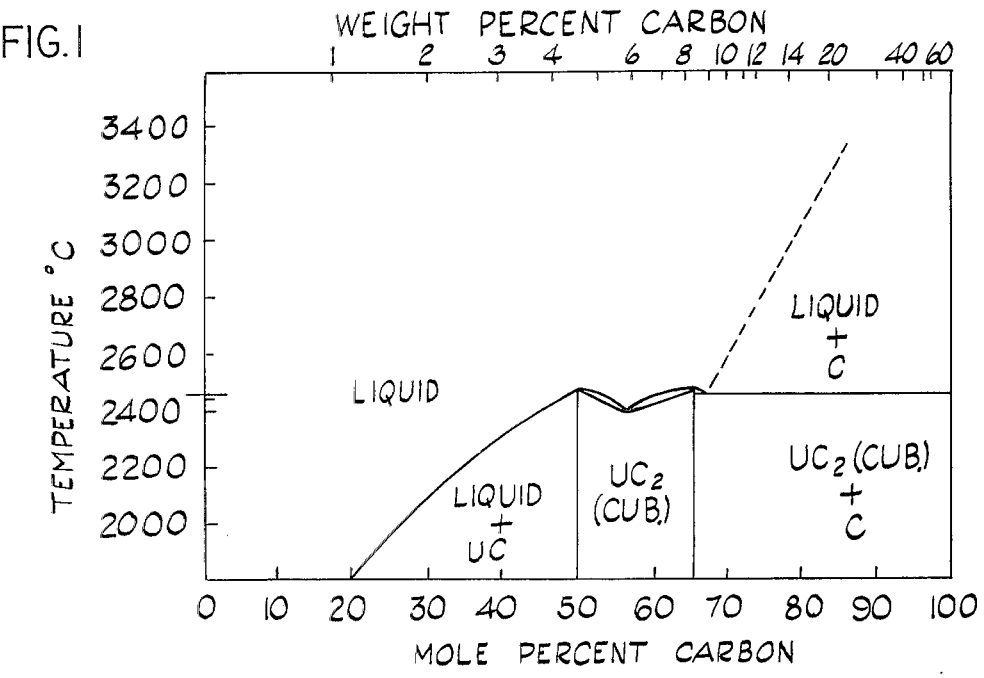
FIG. 1 is a phase diagram of the Uranium-Carbon system.

It has been found that refractory carbide materials, such as uranium carbide, have a very low tendency to dissolve in highly crystalline carbon, e.g., graphite. Although the precise mechanisms by which solid solutions of these materials form are not completely understood, and although various refractory carbide materials, such as uranium carbide, appear to be soluble in carbon that is not highly crystalline, such as pyrolytic carbon, uranium carbide appears to have an extremely low solubility in highly crystalline carbon. Thus, it has been found that by enclosing a particle of a refractory carbide within a continuous jacket or shell of highly crystalline carbon, migration of the refractory carbide through the surrounding shell is effectively prevented.

It has also been found that a particle of refractory carbide material can be suitably encased in a continuous shell of highly crystalline carbon by raising the temperature of a particle of refractory carbide material containing a sufficient excess of carbon to a temperature above the melting point of the carbide and then rapidly cooling the particle, in a matter of seconds. Such rapid cooling of a particle of this composition causes a continuous shell of highly crystalline carbon to precipitate out of the refractory carbide molten droplet as the cooling progresses. The thickness of the continuous shell is determined by the amount of excess carbon contained in the particle, the temperature to which the particle has been heated, and the particle size. The particle should contain an amount of carbon in excess of the stoichiometric amount which combines with the refractory metal in its highest usual valence state. The amount of excess carbon provided is one factor in determining the thickness of the shell that precipitates out at the surface of the particle.

As used in this application the term "refractory carbide" refers to any metal or metaloid carbide which remains in the solid state although heated to temperatures in excess of 1000°C. Also, the use of the term "highly crystalline carbon" is employed to refer to forms of carbon, such as natural graphite, which has a three dimensional crystal structure as revealed by X-ray diffraction methods. Preferably, the highly crystalline carbon has an interlayer spacing approaching 3.35 A.

Whereas various refractory metal carbides made with stoichiometric proportions of metal and carbon are solid at temperatures below about 1000°C., these refractory metal carbides may pass through various liquid-solid phases when raised to higher temperatures. Moreover, when the temperature is raised so that the refractory carbide is completely molten, the stoichiometric refractory carbide will often dissolve a still further amount of carbon to form a molten solution of carbon in the liquid refractory carbide. Furthermore, as the temperature of the molten refractory carbide is still further increased, the amount of carbon that will go into solution increases. Subsequently, if the temperature is gradually decreased, carbon begins to precipitate out of the solution until a certain point is reached (termed the eutectic point) where further decrease of temperature results in the hardening of the molten solution into an overall solid phase.

It has been found that for relatively small droplets of a molten solution of carbon in a refractory metal carbide, if cooling of the droplet is effected rapidly enough, the surface of the droplet cools at a sufficiently faster rate than the interior of the droplet causing the carbon to precipitate from the solution at the outer surface of the droplet and resulting in the formation of a thin jacket or shell of highly crystalline carbon on the surface. As long as a sufficient amount of carbon is present, in excess of the stoichiometric amount that combines with the refractory metal at its highest usual valence, a continuous shell is formed about the center core of refractory carbide. The carbon which precipitates from the molten carbide solution, at the high temperatures at which such a refractory carbide is molten, is generally in a highly crystalline form and provides a protective jacket for the refractory metal carbide core.

The carbides of various refractory metals, which carbides are useful for various high temperature applications, can be protected in this manner. Prime examples of refractory metal carbides which can be advantageously protected in this manner are those refractory metals which have nuclear fuel application because they are nuclearly fissile or fertile, such as uranium, thorium, and plutonium. Another class of refractory metals are those which have nuclear energy applications as neutron absorbers or poisons, such as boron, gadolinium, erbium, and samarium. Still other suitable refractory metals which may be protected by this process include, but are by no means limited to, zirconium, hafnium, niobium, titanium, tantalum, vanadium, and tungsten.

Uranium carbide is a good example and is one of the preferred materials for which the process can be employed to produce products having numerous advantages. FIG. 1 illustrates the phase diagram of the uranium-carbon system at temperatures above 2000°C. From the phase diagram, it is apparent that, for a system employing 50 mole percent carbon (equivalent to about 4.86 weight percent carbon of the total weight of uranium and carbon), melting occurs about 2480°C. Likewise, it can be seen from this phase diagram that the compound termed uranium dicarbide melts at about 2500°C. However, examination of the experimental data presently at hand shows that uranium dicarbide is apparently not stoichiometric $UC_2$, but is believed to be somewhere between $UC_{1.86}$ and $UC_{1.94}$. For purposes of the construction of FIG. 1, the composition was assumed to be about $UC_{1.90}$, which composition would contain about 8.8 weight percent carbon.

If a greater amount than about 8.8 weight percent carbon is included in the total system, as the molten system is cooled to about 2500°C., the solution should become super-saturated in carbon so that carbon will begin to precipitate out. However, as can be seen on the phase diagram, a eutectic point does not occur at the precise composition of pure uranium dicarbide, but occurs at a point slightly to the right thereof. Although present experimentation shows that the eutectic composition has about 9.5 weight percent carbon, this eutectic structure is not observed in the particles which result from the process of this invention. Presently, it is believed that the carbon, which would ordinarily participate in the formation of such a eutectic composition, instead precipitates on the surface of the droplet as a part of the shell. Shells have been observed on certain size particles formed from droplets having compositions as low in carbon content as about 9.4 weight percent of carbon. As will be discussed more fully hereinafter, the greater the excess amount of carbon which is present and is dissolved in the molten solution of the liquid droplet, the thicker is the resultant crystalline carbon shell on the hardened particles.

It is important that the cooling of the droplets be carried out rapidly so that differential cooling is effected, i.e., the outer surface of the droplet being cooled while the interior thereof remains substantially molten, so that precipitation occurs at the outer surface. The precise limits of time in which the cooling should be effected before a continuous highly crystalline carbon shell is produced varies somewhat with the different refractory metal carbides and with the size of the droplets. The cooling time spoken of is considered to be the time it takes to cool the molten droplet from its maximum temperature to a state in which a sufficiently thick outer portion of the particle has hardened to maintain the integrity of the particle, regardless of the fact that the very center of the particle may remain molten for a slightly longer time. As a general rule, it can be said that the cooling should take place in a matter of seconds, i.e., and less than about a minute. A cooling time of about 20 seconds or less is usually employed, and a cooling time of less than about 2 seconds is preferably used.

In general, carbide particles having these improved properties can be advantageously produced in particle sizes up to about 500 microns. Although the process is operable to produce shells on particles of even larger sizes, because of the fairly great disparity between the thickness of the shell and the overall diameter of the core, particles of this type above about 20 mils in size may not have practical applications.

The thickness of the shell is dependent upon the amount of excess carbon in the molten droplet, the rate of cooling and the overall size of the droplet. Shells having thickness of greater than about 6 microns have not been yet observed on uranium dicarbide particles. This may apparently be an upper limit to the thickness of the shell which precipitates out of the molten refractory carbide droplet upon cooling. Moreover, it can be seen the larger the size of the particle, the lesser the weight percent of excess carbon that is required to produce a shell of a given thickness of say 4 microns. Of course, it is apparent that a certain thickness of a shell cannot be formed if sufficient excess carbon is not present in the molten droplet to produce such a shell. At the same time, the cooling rate is not a truly independent variable in the shell formation because, if a sufficiently rapid cooling rate is employed, for example, less than about 2 seconds, substantially all of the excess carbon available may precipitate out on the surface of the particle to provide a shell of up to about 6 microns in thickness. However, when slower cooling rates are employed, then the rate of cooling becomes a factor inasmuch as all of the available carbon may not be precipitated out at the surface of the particle.

The minimum amount of excess carbon necessary to create a shell of given thickness on a particle of given core radius can be simply calculated. The following calculations are base upon a uranium-carbon system.

Geometrically, it can be shown that:

$$\frac{Vs}{Vp} = \frac{3t}{r} + \frac{3t^2}{r^2} + \frac{t^3}{r^3} \qquad \text{(equation 1)}$$

wherein
$r$ = radius of the particle core
$t$ = thickness of the shell
$Vs$ = volume of the shell
$Vp$ = volume of the particle core
However, when $t$ is quite small relative to $r$, the last two terms may be ignored so that the following equation becomes a workable approximation:

$$\frac{Vs}{Vp} = \frac{3T}{r} \qquad \text{(equation 2)}$$

$$\text{Then,} \quad \frac{\text{weight of shell}}{\text{weight of particle core}} = \frac{d_s Vs}{d_p Vp}$$

wherein
- $ds$ = density of shell (assume 2gm/cc for carbon)
- $dp$ = density of particle core (assume 10 gm/cc for uranium dicarbide)

$$\text{and} \quad \frac{Ws}{Wp} = \frac{2(3t)}{10(r)} = \frac{3t}{5r} \quad \text{(equation 3)}$$

Assuming, the core to be in the form of $UC_{1.9}$ (8.8 weight % carbon):

$$\text{Total weight \% carbon} = 8.8 + 100 \frac{(Ws)}{(Ws+Wp)}$$

$$\text{Total w/o carbon} = 8.8 + \frac{100}{1 + \frac{Wp}{Ws}} \quad \text{(equation 4)}$$

Substituting equation 3 into equation 4:

$$\text{Total w/o carbon} = 8.8 + 60 \frac{(t)}{(0.6t+r)}$$

Ignoring the $0.6t$ which is small compared to the value of $r$, the formula becomes:

$$\text{Total w/o carbon} = 8.8 + 60 \frac{T}{r}$$

The following table shows illustrative calculated minimum values of total weight % carbon needed in the molten droplet to produce a shell of the specified thickness:

TABLE I

| r (core radius) | t = 1 micron | t = 6 microns |
| --- | --- | --- |
| 25 microns | 11.0 w/o C | 23.2 w/o C |
| 50 microns | 10.0 w/o C | 16.0 w/o C |
| 100 microns | 9.4 w/o C | 12.4 w/o C |

As can be seen from the table above, the total weight percent carbon needed in a molten droplet to produce a shell of a desired thickness varies according to the radius of the particle. Accordingly, no absolute value can be given in terms of weight percent. Moreover, it should be realized that the Table I values are for a uranium-carbon system and that the weight percents given would inherently be different when different refractory metals than uranium are employed. Inasmuch as it is believed that the minimum thickness of shell which provides the desirable advantages is a shell thickness of about 1 micron, the best definitive expression of the amount of carbon which should be present in the molten refractory carbide droplet is: sufficient carbon should be included, in excess of the amount of carbon which stoichiometrically combines with the refractory metal at its highest valence, to provide a shell 1 micron thick having a density of at least about 2 grams per cc.

The temperature employed must be above the melting point of the refractory carbide so that there is a substantial liquid phase formed before cooling, and should be high enough so that substantially all of the carbon is in the solution. When carbon is completely dissolved, precipitation occurs on the surface of the hardening droplet to a greater extent than if there remains an actual two phase system, i.e., solid carbon particles and the liquid solution. As can be seen by reference to FIG. 1, if about 13 weight percent carbon is employed, the temperature of the molten droplet should be raised to at least about 2800°C. so that all of the carbon is at one time in solution.

At the high temperatures which are employed, the carbon which precipitates out of the solution is in a fairly highly crystalline form. In addition, various refractory carbides catalyze the transformation of carbon into graphitic crystals. In this respect, uranium dicarbide is an excellent catalyst which promotes the formation of graphite crystals. Accordingly, when a uranium-carbon system is used, the shell which precipitates out is graphitic in nature, and serves as an excellent barrier against subsequent migration of uranium therethrough. The nature of this thin, hard, continuous graphite shell is such that there is a high insolubility of the uranium dicarbide in the shell material. Moreover, even if the particle is subsequently raised to a temperature sufficient to melt the core, the shell confines the core in its molten state at least for a short period, so long as the particles remain a fair distance, say about 100°C., below the temperature reached during their manufacture and there was sufficient carbon present to saturate the molten solution at that manufacturing temperature. Containment of the core material can be quite valuable, for example, it will permit exposure to high temperatures which are encountered in various fabrication processes for treating the particles to form desired end products.

Heating to form the droplets can be carried out in any suitable manner. The term "granule" is hereinafter used to describe the droplets before they are melted. The desired amount of carbon in excess of the stoichiometric amount is usually included in the granule, as by forming the granules from a mixture of carbon powder and the refractory carbide or from a mixture of carbon powder and a metal in its elemental state (or in a compound thereof, such as the metal oxide), in which latter case conversion to the refractory carbide occurs when melting takes place. An alternative way of providing the necessary carbon in the granules is by coating the refractory carbides in the desired size range with sufficient pyrolytic carbon which will dissolve in the molten droplets and precipitate out upon cooling.

One acceptable method for forming relatively small droplets is dropping granules through a hot zone. Other suitable ways include the use of a plasma jet, a plasma torch, or arc plasma. The heating means employed should be used in a manner so that the granules are heated throughout and become completely in a molten state, so that the carbon is uniformly in solution in the molten refractory carbide. Indiscriminate heating may cause only the outer surface to become molten while the center remains solid. In such an instance, all of the excess carbon provided in the granule may not get into solution and thus, when cooling begins, this carbon may not be available to precipitate out and may result in either a thinner or an incomplete shell on the resultant particle. Accordingly, if a heated zone is employed, it is important that the granule be within that zone for sufficient time to become completely molten.

Various suitable methods for disposition of the granules during the heating step may be employed. However, droplets should preferably be disposed so that the entire surface of the molten droplet is free and precipitation may generally uniformly take place along the entire surface to form the desired continuous shell. Accordingly, it is preferable to dispose the droplets in a fluid which is nonreactive with the refractory carbide and with carbon. Inert gases may be conveniently used. When such a fluid is employed, the inherent surface tension of the droplet is sufficient to form the molten droplet into a spheroid so that, after cooling, the resultant particle is spheroidal in shape.

The forming operation is conveniently carried out while the granules are disposed in an inert gas, such as argon or helium, using any of the above-mentioned heating means. An apparatus for performing this process on a continuous basis by dropping the granules through a heated zone of sufficient length and cooling the falling particles before they reach the bottom is described hereinafter in this application. Other suitable processes may also be employed. Whatever process is employed, it is important that the cooling be regulated so that rapid cooling is effected so that the outer surface of the droplet is cooled far more rapidly than the interior causing precipitation to occur at the outer surface.

Once these particles are produced, and before they are used, it may be desirable to provide the particles with a further outer covering which will protect the integrity of the thin shell. Any suitable material which is compatible with the highly crystalline carbon of the shell may be employed as a protective outer covering. The particles may be conveniently coated with pyrolytic carbon to provide the desired protection. One method for coating particles with pyrolytic carbon is disclosed in copending application Ser. No. 272,199, filed Apr. 11, 1963, now U.S. Pat. No. 3,325,363 and assigned to the assignee of this application. Although various thicknesses of a protective outer coating may be employed, it is considered that a coating of about 10 to 50 microns thick of pyrolytic carbon having a density of about 2 grams per cc. will provide an adequate outer covering that will both support the thin shell and protect it from damage.

It is often desirable to employ nuclear fuel refractory carbides, such as uranium carbide, in the form of stable fuel compacts in various nuclear energy applications. For example, such pyrolytic carbon-coated fuel particles are especially well-suited for inclusion in graphite matrix fuel compacts. In making such fuel compacts, it is often desirable to employ relatively high temperatures to produce fuel-bearing compacts which are dense and have good structural strength. By employing the improved fuel particles set forth above, temperatures between 2000° and 2400°C. and higher may be used in forming the compacts without causing deterioration of the improved fuel particles as a result of melting and migration of the nuclear fuel.

The invention is further illustrated by the following examples which should be understood as to not to constitute limitations upon the invention which is defined solely by the claims which appear at the end of this specification.

EXAMPLE I

Figure 2:
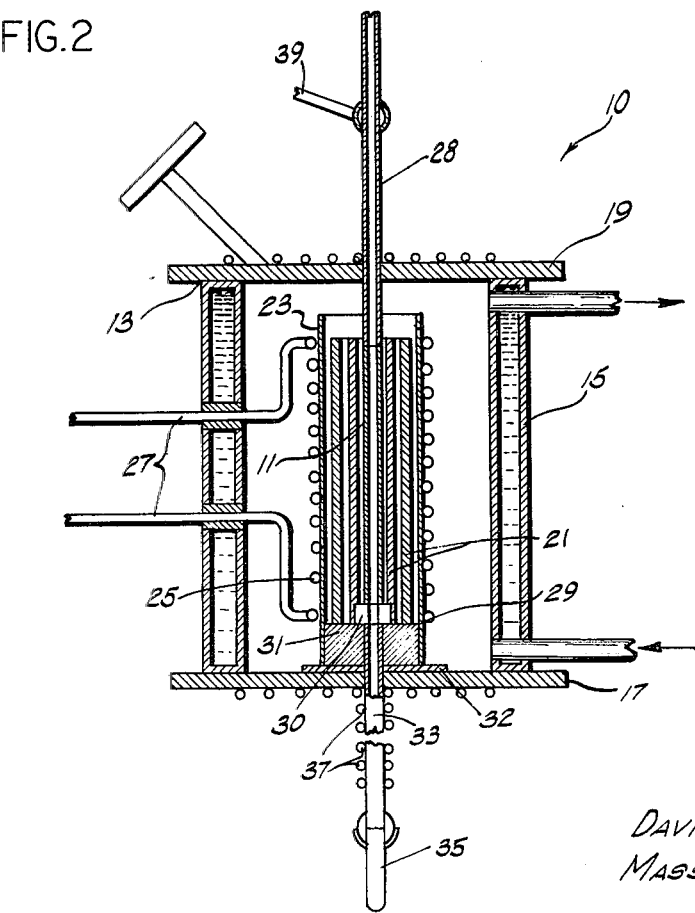
FIG. 2 is a diagrammatic view of apparatus suitable for performing processes embodying various features of the invention.

Apparatus 10 for carrying out the processes previously described to form the improved refractory metal carbide particles is diagrammatically illustrated in FIG. 2.

Briefly, a heating zone is provided by a vertical susceptor, in the form of a tungsten or pyrolytic carbon tube 11, which is disposed relatively centrally within a high temperature furnace 13 having vertical walls 15, a bottom 17, and a top 19 made of a suitable material such as aluminum or copper. The integrity of the furnace materials are maintained by passing a suitable coolant, such as water, continuously through the walls or in association with the top and bottom through suitable coils. Concentric outer shields 21 may be employed about the susceptor 11, which shields may be made of materials such as tungsten, tantalum, molybdenum or pyrolytic carbon. The susceptor and shield arrangement is preferably disposed within an outer high temperature container 23 made of a suitable material such as thoria, zirconia or alumina. In the illustrated apparatus 10, the heating of the susceptor 11 is done inductively by means of a high-frequency coil 25. Insulated leads 27 to the coil pass through the vertical walls 15 of the furnace and are connected exterior of the furnace to a source of high voltage alternating current.

The granules are fed to the furnace 13 via an upper drop tube 28. The drop tube 28 employs a screen of suitable size near its top. The proportioning of the openings in the screen are such that only single granules can pass through the separate openings so that a collimated stream of granules falling downward through the drop tube is established. Suitable feed means may be employed, such as a vibratory feeder, to assure that the desired granule flow is accomplished. A bottom support 29 of a plurality of rods 30 upstanding from a block 31 (made from tungsten for a tungsten susceptor and from porous carbon for a pyrolytic carbon susceptor) supports the susceptor 11 and shields 21. The bottom support 29 rests upon a ceramic stand-off disc 32 and both contain a central bore through which a cooling tube 33 extends directly vertically below the susceptor 11. The cooling tube 33 is of sufficient length so that the falling droplets have at least been cooled on the outside thereof so that the precipitation of the highly crystalline carbon is complete and the particles have become integral bodies (although the innermost portions of the core may still be molten) before the particles reach a suitable detachable container 35 which is located at the bottom of the cooling tube 33. The cooling tube 33 is provided with suitable cooling means, such as an encircling spiral cooling coil 37 in association with the outer surface thereof in order that the desired rapid cooling rate is effected.

Moreover, because it is desirable to carry out the method of forming the particles in an inert gas atmosphere, means 39 are provided in association with the drop tube 28 for supplying a stream of inert gas which then flows downward through the tube 28 and the susceptor 11 to a gas outlet provided in association with the cooling tube 33.

In general, the necessary length of the hot zone and the temperature at which the hot zone is maintained are dependent upon the size of the granules being treated, and, of course, the melting point of the refractory material being treated.

Granules of uranium dicarbide nuclear fuel are prepared from a mixture of powdered uranium dicarbide and powdered refractory grade carbon. The uranium used is enriched and contains about 92 percent $U_{235}$. The powders are intimately dry-mixed with about 2 weight percent of ethylcellulose, a binder. Sufficient trichloroethylene, a solvent for ethylcellulose, is added to dissolve the ethylcellulose and form a slurry. Agitation of the slurry is carried out to obtain agglomerates of uranium dicarbidecarbon of a size from about 40 to 60 microns, which are then oven-dried at about 140°F. The granules contain about 10 weight percent carbon based upon total weight of uranium and carbon.

The granules are treated using a tungsten susceptor 11 about 6 inches in length which is heated to a temperature of about 3000°C. A cooling tube 33 about 2 feet long is employed which is maintained at an average temperature of about 30°C. As the granules fall through the hot zone provided by the susceptor, they are completely melted and form molten droplets in which the carbon is entirely in solution in the molten uranium dicarbide. Observation of the falling particles shows that they become solid about 1 foot below the bottom end of the hot zone. Accordingly, the approximate cooling time is calculated to be less than about one second.

The collected particles are examined and are found to be spheroids of a size between about 30 and about 50 microns. Photomicrographic examination shows that each of the particles has an outer graphite shell of about 1 micron in thickness.

To test the integrity and continuity of the shell, various of the particles are immersed in concentrated nitric acid. If there are breaks in the shells or if the shells are incomplete, the concentrated nitric acid reacts with the uranium and minute bubbling can be observed. Very few of the particles exhibit any reaction.

The particles are then transferred to a fluidized bed coating apparatus wherein they are uniformly coated with a 10 micron thick protective coating of pyrolytic carbon using a bed temperature of about 2100°C. and a mixture of methane and helium with a methane partial pressure of about 0.15 (total pressure 1 atm.). At the completion of this coating step, the coated particles, in an amount of about 20 volume percent, are blended with about 60 volume percent graphite powder and about 20 volume percent pitch. The mixture is extruded to form a cylindrical rod. Sections of this extrusion are compressed under about 5000 p.s.i. while being heated to 2300°C. for about 40 minutes to form compacts of the fuel particles dispersed in a graphite matrix.

Examination of the compacts shows that they have excellent structural strength. Examination of the compacts by radiographic methods and metallographic methods illustrate that the graphitic shells effectively prevent migration of uranium therethrough even though the particles are subjected to the high temperature of the forming operation. These particles are considered to be excellently suited for use in high temperature nuclear reactors for space flights and other high temperature nuclear energy applications.

EXAMPLE II

The general procedure of Example I is repeated except that a mixture of powdered uranium dioxide and powdered refractory grade carbon is employed that is reacted to form uranium dicarbide. The uranium dioxide used is enriched and contains about 92 percent $U_{235}$. Sufficient carbon is provided in the mixture to satisfy the stoichiometric amount required for the conversion of the dioxide to the dicarbide and to in addition provide in the resultant converted granules, about 10 percent by weight carbon (which amount is in excess of the approximately 8.8 weight percent carbon that is in the chemically bound to the uranium as the dicarbide). In addition, about 2 percent by weight of ethylcellulose is added to the mixture of the dioxide and the carbon.

The powders are intimately mixed while dry and then sufficient trichloroethylene is added to form a slurry. Agitation of the slurry is carried out to obtain agglomerates of uranium dioxide-carbon of a size from about 100 to 300 microns, which are then oven-dried at about 140°F.

The dried agglomerates are then converted to form the refractory metal carbide-carbon granules. Conversion is carried out by mixing the agglomerates with a volumetric excess of graphite flour (average particle size less than about 20 microns) and disposing this mixture in a graphite crucible. Heating the crucible to a temperature of about 2200°C. under vacuum reduces the dioxide to the dicarbide and effectively removes the gaseous reaction products which are formed during this conversion. The presence of the graphite flour prevents coalescence of the agglomerates with one another. Upon cooling, refractory metal carbide-carbon granules of a size between about 70 microns and 250 microns are provided which are ready for the treatment to provide the desirable highly crystalline carbon outer shells.

To treat particles of this composition and size range, a tungsten susceptor 11 about 6 inches long and 1 inch in internal diameter is employed which is heated to a temperature of about 3000°C. A downward flow of argon is established through the apparatus 11 disclosed in FIG. 2, which flow is maintained at about 0.01 cubic feet per minute. A cooling tube 33 about 2 feet long is employed, and the rate of coolant through the cooling coil 37 is maintained sufficient to keep the average temperature of the tube 33 at about 30°C.

The granules are fed by the feeding means into the drop tube 28 and fall through the hot zone, then through the cooled zone, and are collected in the collector 35 at the bottom. The temperature and length of the hot zone is sufficient to assure that the granules are completely melted and so that the temperature throughout the molten droplets reaches at least about 2700°C. The time which elapses from the point at which the falling particles exit from the bottom of the hot zone until the particles reach the bottom collector 35 is less than about 3 seconds. This time of travel through the cooling tube 33, which is maintained at an average temperature of about 30°C., is sufficient so that the precipitation of the highly crystalline carbon has occurred and the droplets have hardened sufficiently to maintain their spheroidal shape before they reach the bottom collector 35.

The particles which are collected are found to be spheroids of a size between about 50 microns and 200 microns. Photomicrographic examination shows that each of the particles has an outer graphitic shell of about 1 micron in thickness. Testing of the particles in concentrated nitric acid shows that extremely few of the particles exhibit any reaction.

The particles are then coated with an outer protective coating of pyrolytic carbon about 10 microns in thickness using the same conditions as set forth in Example I. A graphite-matrix compact is formed using the conditions as set forth in Example I. Examination of the compacts by radiographic methods and metallographic methods shows that substantially no migration of uranium through the 1 micron graphitic shell occurred. The particles are considered excellently suited for use in high temperature nuclear reactors for space flights or in other types of nuclear energy applications.

EXAMPLE III

The procedure set forth in Example I is repeated, except that the granules initially formed are regulated so that the sizes fall between about 30 and about 40 microns and so that the percentage of carbon is about 18 percent by weight of total uranium plus carbon.

A 6 inch long tungsten susceptor 11 is employed which is heated to a temperature of about 3150°C. From the phase diagram shown in FIG. 1, it can be seen that the molten droplets should be heated throughout to a temperature of at least about 3000°C. so that all of the carbon is in solution in the molten uranium dicarbide. The cooling tube 33 is maintained at an average temperature of about 30°C. Observation of the falling particles shows that the particles achieve a spheroidal solid shape about 1 foot below the bottom of the hot zone.

Examination of the particles collected from this production run shows the resultant particles to be uniformly of a spheroidal shape and of a particle size between about 20 and about 30 microns. Photomicrographic examination of various of the particles shows that an outer graphitic shell about 3 microns in thickness is uniformly formed on the outer surface of each of the particles. Immersion of the particles in nitric acid shows that none of the particles exhibit any reaction which would indicate that the shells were broken or incomplete.

The particles are then uniformly coated with a 10 micron thick protective coating of pyrolytic carbon using the coating conditions set forth in Example I. At the completion of this coating step, the coated particles, in an amount of about 25 volume percent, are blended with about 55 volume percent graphite powder and about 20 volume percent pitch. The mixture is extruded to form a cylindrical rod. Sections of this extrusion are compressed under about 5000 p.s.i. while being heated to 800°C. for about 40 minutes to form compacts of the fuel particles dispersed in a graphite matrix.

Physical examination of the compacts shows that they have excellent structural strength. Examination of the compacts by radiographic methods and metallographic methods illustrate that the graphitic shells effectively prevent migration of uranium therethrough even though the particles are subjected to the high temperatures of the forming operation. These particles are considered to be excellently suited for use in high temperature nuclear reactors for space flights and other high temperature nuclear energy applications.

EXAMPLE IV

The general procedure set forth in Example II is repeated, except that the granules are initially formed of uranium dicarbide spheroids which are coated with an exterior coating of pyrolytic carbon. The spheroids are of a stoichiometric composition of uranium dicarbide and are of a particle size between about 20 and about 30 microns. The spheroids are coated with an outer coating of pyrolytic carbon about 3 microns in thickness by disposition in a fluidized bed coater at a temperature of about 1400°C. using a mixture of 0.3 atm. methane and 0.7 atm. helium.

A 6 inch long tungsten susceptor 11 is employed which is heated to a temperature of about 3000°C. During the drop through the heated zone, the uranium dicarbide spheroids become molten and completely dissolve the carbon from the pyrolytic carbon coating so that all of the carbon is in solution in the molten uranium dicarbide. The cooling tube 33 is maintained at an average temperature of about 30°C. Observation of the falling particles shows that the particles achieve a spheroidal solid shape about 1 foot below the bottom of the hot zone. Accordingly, the cooling time is calculated to be less than about 1 second.

Examination of the particles collected from this production run shows the resultant particles to be uniformly of a spheroidal shape and of a particle size between about 20 and about 25 microns. Photomicrographic examination of various of the particles shows that a continuous outer graphitic shell about 1-2 microns in thickness is uniformly formed on the outer surface of each of the particles. Immersion of the particles in nitric acid shows that none of the particles exhibit any reaction.

The particles are then transferred to a fluidized bed coating apparatus wherein they are uniformly coated with a 10 micron thick protective coating of pyrolytic carbon using a bed temperature of about 2100°C. and a mixture of methane and helium with a methane partial pressure of about 0.15 (total pressure 1 atm.). At the completion of this coating step, the coated particles, in an amount of about 20 volume percent, are blended with about 60 volume percent graphite powder and about 20 volume percent pitch. The mixture is extruded to form a cylindrical rod. Sections of this extrusion are compressed under about 5000 p.s.i. while being heated to 800°C. for about 40 minutes to form compacts of the fuel particles dispersed in a graphite matrix.

Examination of the compacts shows that they have excellent structural strength. Examination of the compacts by radiographic methods and metallographic methods illustrate that the graphitic shells effectively prevent migration of uranium therethrough even though the particles are subjected to the high temperature forming operation. These particles are considered to be excellently suited for use in high temperature nuclear reactors for space flights and other high temperature nuclear energy applications.

EXAMPLE V

The general procedure set forth in Example II is repeated, except that in this instance, granules are formed of thorium dicarbide, uranium dicarbide and carbon of a particle size between about 40 and about 60 microns containing about 12 weight percent carbon based upon total weight of thorium, uranium and carbon. The ratio of thorium to uranium is about 10 atoms to 1 atom. These particles are treated using a tungsten susceptor 11 about 6 inches in length which is heated to a temperature of about 3000°C. A cooling tube 33 about 2 feet long is employed which is maintained at an average temperature of about 30°C. As the granules fall through the hot zone provided by the susceptor, they are completely melted and form molten droplets in which the carbon is entirely in solution in the molten thoriumuranium dicarbide. Observation of the falling particles shows that they become solid about 1 foot below the bottom end of the hot zone. Accordingly, the approximate cooling time is calculated to be less than 1 second.

The collected particles are examined and are found to be spheroids of a size between about 30 and about 50 microns. Photomicrographic examination shows that each of the particles has an outer highly crystalline shell of about 2 microns in thickness. Testing of the particles in concentrated nitric acid shows that none of the particles exhibits any reaction, which reaction would be indicative that the shell is either broken or incomplete.

The particles are then transferred to a fluidized bed coating apparatus wherein they are uniformly coated with a 10 micron thick protective coating of pyrolytic carbon using a bed temperature of about 2100°C. and a mixture of methane and helium with a methane partial pressure of about 0.15 (total pressure 1 atm.). At the completion of this coating step, the coated particles, in an amount of about 20 volume percent, are blended with about 60 volume percent graphite powder and about 20 volume percent pitch. The mixture is extruded to form a cylindrical rod. Sections of this extrusion are compressed under about 5000 p.s.i. while being heated to 800°C. for about 40 minutes to form compacts of the fuel particles dispersed in a graphite matrix. Examination of the compacts shows that they have excellent structural strength. Examination of the compacts by radiographic methods and metallographic methods illustrates that the highly crystalline shells effectively prevent migration of uranium through the shells even though the particles are subjected to the high temperature of the forming operation. These particles are considered to be excellently suited for use in high temperature nuclear energy applications.

EXAMPLE VI

The procedure as set forth in Example II is repeated, except that granules of boron carbide of a particle size between about 90 microns and 110 microns are made in which the weight percent of boron is about 38 percent, based upon total weight of boron plus carbon. A tungsten susceptor 11 about 6 inches long is employed and is heated to a temperature of about 3000°C. The temperature of the cooling tube 33 is maintained at about 30°C. In the downward travel through the hot zone provided by the susceptor, the boron carbide particles reach a temperature of at least about 2800°C. throughout, at which temperature all of the carbon is in solution in the molten boron carbide ($B_4C$). Observation of this production run shows that the particles reach a spheroidal hardened shape about 1 foot below the end of the hot zone. Accordingly, the cooling time is less than about 1 second.

The particles collected from this production run are examined and are shown to be spheroidal in shape and of a particle size between about 60 microns and about 90 microns. Photomicrographic examination shows that each of the particles has an outer layer of highly crystalline carbon about 4 microns thick. The particles are immersed in concentrated nitric acid, and no reaction is observed.

The particles are then heated in a crucible to a temperature of about 2000°C. for about 10 minutes. After cooling, examination of the particles shows that the highly crystalline carbon shells of the particles remain intact.

These particles are considered to be well suited for use in high temperature nuclear reactors as a nuclear poison and for other types of high temperature nuclear energy applications.

EXAMPLE VII

The procedure set forth in Example IV is repeated using granules which have been prepared from titanium carbide of a size between 90 microns and 110 microns and containing carbon in an amount of about 26 weight percent based upon total weight of titanium plus carbon. A pyrolytic graphite susceptor 11 is employed about 6 inches in length which is heated to a temperature of about 3400°C. The cooling tube 33 is maintained at an average temperature of about 30°C. The temperature and length of the graphite susceptor 11 is sufficient so that the falling titanium carbide droplets become completely molten and the excess carbon is dissolved in the solution of molten titanium carbide. Observation shows that at a point of about 1 foot below the end of the bottom of the graphite susceptor, the falling particles obtain a hardened spheroidal shape.

The particles are collected and examined and found to be in the form of spheroids of a size between about 60 microns and about 90 microns. Photomicrographic examination shows that a graphitic shell about 2 microns thick is uniformly formed on the outside of each of the particles. Immersion of the particles in concentrated nitric acid shows that no reaction occurs. These titanium carbide particles are considered well suited for high temperature operations.

The invention provides an improved process for the production of particles of refractory metal carbides which exhibit excellent high temperature stability and also stability under high level neutron irradiation. The simplicity of the process affords consistency in results and provides a product of excellent uniformity. As pointed out in the description, the invention is especially suitable for the production of refractory metal carbides for use in nuclear energy applications, especially nuclear fuel carbides.

Various of the features of the invention are set forth in the following claims.

What is claimed is:

1. A method of making refractory carbide particles, which method comprises heating a granule containing refractory metal and carbon to a sufficient temperature to form a molten droplet of refractory carbide, carbon being included in said droplet in excess of the stoichiometric amount which combines with the refractory metal in the highest usual valence thereof, and cooling said molten droplet below the eutectic temperature within 60 seconds or less to cause a thin continuous layer of highly crystalline carbon to precipitate out on the outer surface thereof.

2. The method of claim 1 wherein sufficient excess carbon is included to form an outer carbon shell at least one micron in thickness and of a density of at least about 2 grams per cc and wherein said cooling of said molten droplet below the eutectic temperature is accomplished in about 20 seconds or less.

3. The method of claim 1 wherein said heating is carried out to a sufficient temperature to dissolve substantially all of the excess carbon present in the molten refractory carbide.

4. The method of claim 1 wherein said cooling of said molten droplet below the eutectic temperature is accomplished in about 2 seconds or less.

5. The method of claim 1 wherein said highly crystalline carbon which precipitates out has an interlayer spacing approaching 3.35 Angstroms.

6. The method of claim 1 wherein said heating and cooling is carried out by dropping the granules through a heated zone followed by a cooled zone so that the resultant particles are spheroidal.

7. The method of claim 1 wherein said refractory metal is a nuclear fuel.

8. The method of claim 1 wherein said refractory metal is a nuclear poison.

9. The method of claim 7 wherein said nuclear fuel is uranium and at least about 9.4 weight percent carbon is included in said droplet based upon total weight of carbon and uranium.

10. The product resulting from the method of claim 1.

* * * * *